United States Patent [19]

Gandar et al.

[11] Patent Number: 5,247,307
[45] Date of Patent: Sep. 21, 1993

[54] PROCESS FOR THE RECOGNITION OF AN AERIAL TARGET FROM ITS RADAR ECHO

[75] Inventors: Olivier Gandar, Antony; Franck Vasseur, Draveil, both of France

[73] Assignee: Thomson-CSF, Puteaux, France

[21] Appl. No.: 789,752

[22] Filed: Nov. 8, 1991

[30] Foreign Application Priority Data

Nov. 9, 1990 [FR] France .................... 90 13940

[51] Int. Cl.$^5$ ............................................ G01S 13/52
[52] U.S. Cl. ................................... 342/192; 342/90
[58] Field of Search .............................. 342/192, 90

[56] References Cited

U.S. PATENT DOCUMENTS

| | | | |
|---|---|---|---|
| 4,348,674 | 9/1982 | Muth et al. | 342/192 |
| 4,707,697 | 11/1987 | Coulter et al. | 342/90 X |

FOREIGN PATENT DOCUMENTS

| | | | |
|---|---|---|---|
| 2593608 | 7/1987 | France . | |
| 0061669 | 4/1985 | Japan | 342/192 |
| 0124478 | 6/1987 | Japan | 342/90 |
| 62-124478 | 6/1987 | Japan | 342/90 |
| 2054310 | 2/1981 | United Kingdom . | |
| 1605308 | 11/1988 | United Kingdom . | |

OTHER PUBLICATIONS

A.G.A.R.D. Conference Proceedings No. 197 On New Devices, Techniques and Systems in Radar, 1977, O.T.A.N., pp. 16-1 to 16-9, G. Graf, "Radar Cross Section Analysis And Target Imaging From The Doppler Information In The Radar Echo".

ICASSP '88, M, vol. II, Multidimensional Signal Processing, New York, Apr. 11-14, 1984, pp. 1212-1215, D. H. Johnson, "Application Of The Hough Transform To Doppler-Time Image Processing".

Primary Examiner—Gilberto Barrón, Jr.
Attorney, Agent, or Firm—Oblon, Spivak, McClelland, Maier & Neustadt

[57] ABSTRACT

Process for the recognition of an aerial target from samples of its radar echoes. First, Doppler radar emission is transmitted in the direction of the target. A Doppler spectrum echo signal of the target is then detected. At the center of the signal, a principal line corresponding to the aircraft's velocity is detected. The distance between this principal line and secondary lines of the spectrum signal is then determined. From the value of this distance and the relative configuration of the spectrum signal, the target can be classified into a predetermined target category. In this step, in particular, at least one intrinsic parameter of the spectrum signal can be determined, e.g., the number of secondary lines, the intensity of the secondary lines relative to the principal line, the absolute intensity of these secondary lines with allowance for the distance of the target, the equivalent radar surface of the target. Based on these intrinsic parameters, a preliminary determination of the category of the target from among several predetermined categories can be made. The spectrum signal can also be compared to a number of reference series established previously and memorized in a library of spectra corresponding to known targets, and the reference spectra having the strongest intercorrelation with the spectrum signal of the signal received is then determined to correspond to the detected spectrum signal.

23 Claims, 2 Drawing Sheets

PROCESS FOR THE RECOGNITION OF AN AERIAL TARGET FROM ITS RADAR ECHO

BACKGROUND OF THE INVENTION

The present invention concerns a process for the recognition of an aerial target from its radar echo.

The present invention is applied in particular to the recognition of aerial targets from an airborne radar, for example when a pilot of a fighter aircraft wishes to know, before visual contact is established, the nature of the target (e.g. jet airliner, propellor aircraft, military aircraft, etc.) and, if possible, not only the general category of target, but also, for a given category, the precise type or model (for example, for an airliner-type aircraft, whether it is an Airbus, a DC-10, etc.).

The present invention is not, however, restricted to this application for the recognition of targets from an airborne radar; it can also be applied for example to the recognition of targets by land-based or naval radar, provided this radar allows, as will be seen later, acquisition in Doppler mode.

Until the present time, when an aircraft enters air space covered by a radar, the only means of obtaining precise identification is by radio or by an IFF (Identification Friend or Foe) identification signal, if the aircraft in question is cooperative.

On the other hand, if the target does not respond to radio interrogation or IFF and if it is out of visual range, there is no means of determining whether or not it is hostile, or even whether it is really an aircraft or an electronic countermeasure intended as a lure, to jam the radar.

Only visual identification may then be used, which requires good visibility and implies greatly reduced identification distance and late identification.

SUMMARY OF THE INVENTION

The purpose of the present invention is to propose a target recognition process which allows a pilot, when a target enters his radar field, not only to identify the position of the latter (the parameter which was until now the only information conveyed in the absence of a response to an IFF interrogation signal, except perhaps for the velocity), but also to determine the corresponding category of aircraft, or, at the very least, to have an indication of the degree of danger as regards this target (an airliner obviously being a less dangerous target than a military aircraft).

Another purpose of the invention is to propose a target recognition process which, in addition, provides the pilot with a warning system intended to activate ECC (Electronic Counter-Countermeasure) devices when the target's echo displays variations indicating not an aircraft but an activated jamming device.

The present invention also makes it possible, when the radar is operating in TODI mode (Tracking On Discontinuous Information), a searching phase where the radar tracks the target by intermittent sampling, then in TOCI mode (Tracking On Continuous Information), where the radar is constantly locked on the target, to check whether, after transition from TODI to TOCI mode, the continuous tracking is still acting on the same target as the one located and tracked during the TODI phase, or whether, during the transition, the tracking has suddenly transferred to another target located near to the first one, and which s not the target which the pilot wishes to intercept.

These different objectives are achieved, according to the invention, by a process including the following stages:

(a) transmit a Doppler radar emission in the direction of the target,
(b) determine the spectrum line series forming the Doppler spectrum of the echo of the target,
(c) search for, at the center of the series, a principal line corresponding to the aircraft's velocity,
(d) determine the distance between this principal line and the secondary line of first order of the series, and
(e) from the value of this distance and the relative configuration of the lines of the series, classify the target in a predetermined target category.

In a first method of implementation of the process of the invention, in the target classification stage (e), at least one intrinsic characteristic of the spectrum is determined and, from this intrinsic characteristics, a preliminary classification can be made for one category of target among several predetermined categories.

The intrinsic characteristics can in particular include the number of secondary lines in the series, the relative intensity of the secondary lines in relation to the principal line, or the absolute intensity of the secondary lines, adjusted to allow for the target distance.

In the target classification stage (e), the target's cross section can also be used as a determining parameter.

In a second method of implementation of the process of the invention, which may be used both as an alternative or a complement to the first method of implementation, in the target classification stage (e), the spectrum line series forming the Doppler spectrum of the echo is compared to several reference series previously established and memorized in a library of series corresponding to known targets, and the reference series displaying the best correlation with the line series forming the Doppler spectrum of the signal received is selected.

Moreover, stage (d), comprising the determination of the distance between the central line and the first order line of the series, can advantageously include a filtering stage for the Doppler samples, only conserving those samples displaying frequency jumps at least double the average distance noted for the previous samples, and/or only conserving samples when at least 3 lines are identified.

In addition, a complementary stage can be envisaged for detecting any modification of the target classification established in stage (e), and for triggering electronic counter-countermeasures if any such modification is discovered.

Similarly, when the process is used as part of a procedure involving the transition from tracking on discontinuous information to tracking on continuous information, a complementary stage can advantageously be included comprising the comparison of the target classifications established in stage (e) respectively before and after the said transition, and, if this comparison is negative, triggering a warning indicating that tracking has transferred to another target.

BRIEF DESCRIPTION OF THE DRAWINGS

A detailed description of the present invention will now be given, with reference to the appended figures in which.

DESCRIPTION OF THE PREFERRED EMBODIMENT

The process of the invention uses the frequency spectrum produced by the echo received from a signal emitted by a Doppler radar.

It is known that a Doppler radar makes use of spectra, the fundamental data component being the Doppler frequency of the target, corresponding to a relative displacement velocity in the direction of the radar source at the instant when the echo was reflected.

Figure 1:
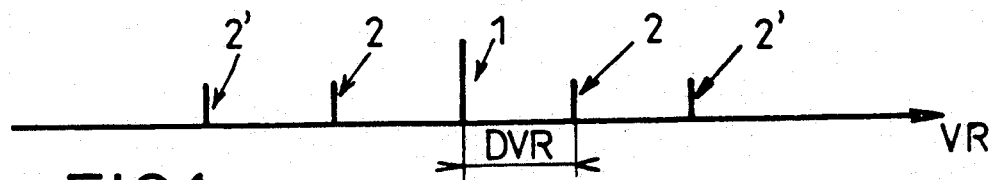
FIG. 1 shows an example of simple Doppler spectrum, typically corresponding to a target with a single motor.

At a given moment (supposing one is working in a sampling mode), the Doppler spectrum has a principal line 1, shown in FIG. 1, corresponding to the relative velocity of the target in the direction of the radar source at the instant when the echo was reflected.

In practice, the spectrum received also includes secondary lines such as 2 and 2', positioned symmetrically about the principal line 1. Therefore, apart from the principal line 1, a first order line, labelled 2, a second order line, labelled 2', and so on are received, these different lines all being separated by a constant velocity difference DVR (in practice, spectrum lines up to the tenth order, or even higher, can be obtained for analysis, giving a total of twenty or more secondary lines).

These secondary lines 2, 2', etc., are mainly generated by the compressor blades of the target's jet engine, and are therefore characteristic of these engines. Echos from engines, although the predominant source of secondary lines, are not the only one, as there are other phenomena, such as structural vibrations in particular, also producing secondary lines.

Figure 2:
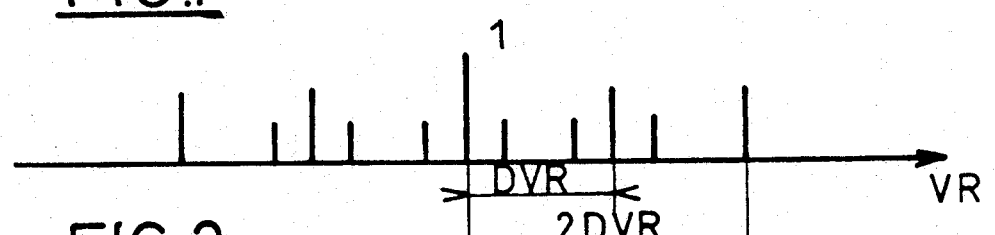
FIGS. 2, 3 and 4 show examples of complex Doppler spectrum, typically corresponding to a target with several motors creating intermodulation lines.

In the case of a target with several engines, other lines are also found, as illustrated in FIG. 2, these lines having a smaller amplitude, such as 3', corresponding to the intermodulations between the secondary lines of the target's various engines.

The basic idea of the invention is to exploit the spectral characteristics linked to each target in order to classify the latter into different categories (airliner, military aircraft, etc.) and, within each category, into different types of aircraft.

It is known that—and this observation is the basis of the invention—for a given category and type of aircraft, during an interception the difference DVR between the principal line and the first order secondary lines is a parameter which tends to remain constant. It is even found that, over several flights, the line series is more or less identical for a given target.

First, it is possible to establish an initial approximate determination of the category of target from the intrinsic characteristics alone of the spectrum received, especially from the following parameters:

the number of secondary lines in the series (secondary lines from the engines and intermodulations): a rich spectrum indicates an aircraft with several engines, which is therefore likely to be an airliner;

the absolute intensities (weighted of course to take into account the target distance) of the secondary lines of the series, i.e. the intensities of these lines in relation to the thermal noise: a high intensity is indicative of a very exposed engine (such as those of airliners like the Airbus), whilst a low intensity is indicative of an engine within the fuselage;

the relative intensity of the secondary lines of the series in relation to the principal line, in other words the "contrast" between these secondary lines and the principal line: therefore, an inboard engine produces a much less contrasting spectrum than a very exposed engine;

the cross section (ERS), which can be calculated using the standard equation:

$$0 \log(ERS) = S/N + 40 \log(d) - Y,$$

where S/N is the signal-to-noise ratio expressed in decibels, d is the distance from the radar to the target and Y is a constant representing the radar's power rating, incorporating various factors such as transmitting power, antenna gain, etc.

It is therefore possible, using the spectrum of an echo, to examine these different intrinsic parameters and intercorrelate them in order to arrive at an initial approximate determination of the category of target among several predetermined categories.

Figure 3:
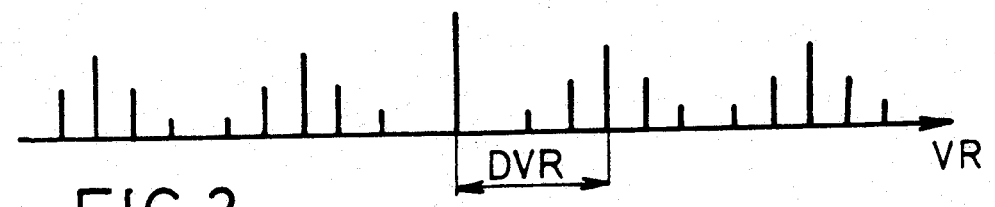
Figure 4:
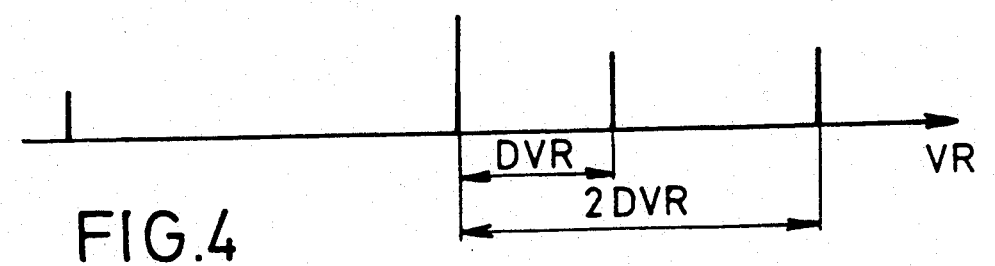

It is then possible to make a precise determination, within this category of target, of the type of target, intercorrelating the series of the spectrum lines received (as illustrated in FIG. 4) with a set of reference spectra (such as the one shown in FIG. 3).

The various reference spectra will have been previously determined by in-flight recording of spectral "signature" of identified aircraft. Thus a library of reference signatures or spectra is constituted to be used as a basis for comparison and evaluation.

During interception of an unknown aircraft, the signature of this target is compared to the various signatures of this library in order to determine which one is most closely correlated to it and thus identify the most probable target category.

The first stage of this process consists in determining the strongest line of the received spectrum, which will be assumed to be that corresponding to the principal line.

Then the difference DVR between this principal line and the first secondary line is determined.

This stage may involve certain difficulties in that, when searching outwards from the frequency of the principal line, the secondary line of the first order is not always the first one to appear: it is sometimes a second or even third order line, so that the DVR calculated will then be in fact double or triple the real DVR.

To overcome this drawback, preliminary filtering can be carried out on the successive DVR values received during the different samplings, conserving only the values displaying frequency jumps exceeding a fixed value, less than double the average difference recorded on the previous samples. For example, the different samples can be filtered by accepting only DVR values displaying relative jumps exceeding 1.8 (or another value close to this, and strictly less than 2).

In addition, if the number of lines received at a given moment is insufficient (less than 2), the sample is ignored and the previously calculated DVR value is retained until the next sampling.

Having thus determined an approximately stable series of spectrum lines, the known targets in the library mentioned above are then examined to find those which have the nearest DVR values. It has actually been observed that known aircraft have a DVR parameter which always varies between a minimum and maximum Doppler frequency value; one can therefore determine, among the complete set of reference spectra, a subset which correspond to this criterion and which is thus likely include to the target.

Next, for each of the line series in this subset, an intercorrelation test is carried out between the reference spectrum and the spectrum of the radar echo; the reference series which has the highest degree of intercorrelation is selected.

This series will thus correspond to the most probable target type. Of course, in the event of it being impossible to decide between several types of target with sufficiently small uncertainty, an uncertainty coefficient will be attributed to the identification presented to the pilot The implementation of the invention in practice requires only standard equipment, namely a radar operating in Doppler mode and capable of providing, in addition to the principal line, higher order lines distinct from the thermal noise.

The process is implemented advantageously by a computer program analyzing the spectrum provided in numerical form by the means of Doppler signal sampling.

Moreover, apart from identification of an unknown aircraft, the signature obtained can be analysed as it evolves, in order for example to trigger an electronic counter-countermeasure warning, since any modification of the signature occurring without noticeable change in motion of the target is indicative of the activation of a jamming device.

It can therefore be very easily determined whether the target is real or just an electronic countermeasure.

Similarly, when operating in TODI/TOCI mode, the signature of the target established in TODI can be used to check that, on transition to TOCI, the same signature is actually conserved: any modification of the latter would indicate that, during the transition, the tracking has transferred to another target, of a different type, located near the first one, and therefore that the transition has not been carried out correctly, thus implying a return to TODI mode.

Figure 5:
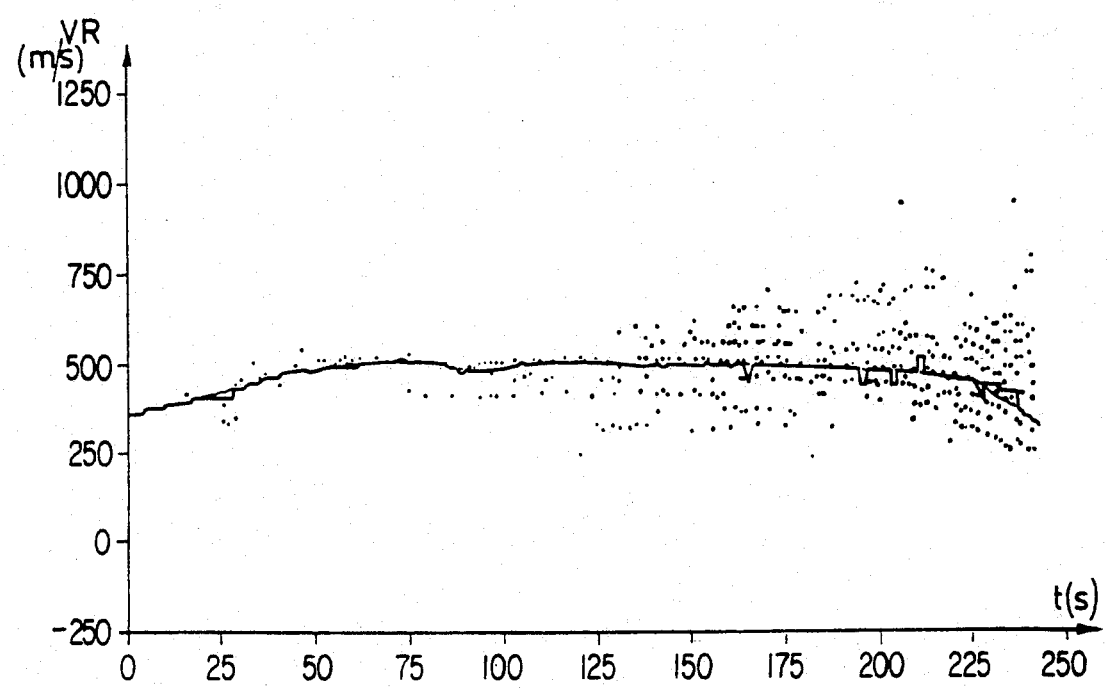
FIGS. 5 and 6 show examples of actual in-flight recordings made on a target.
Figure 6:
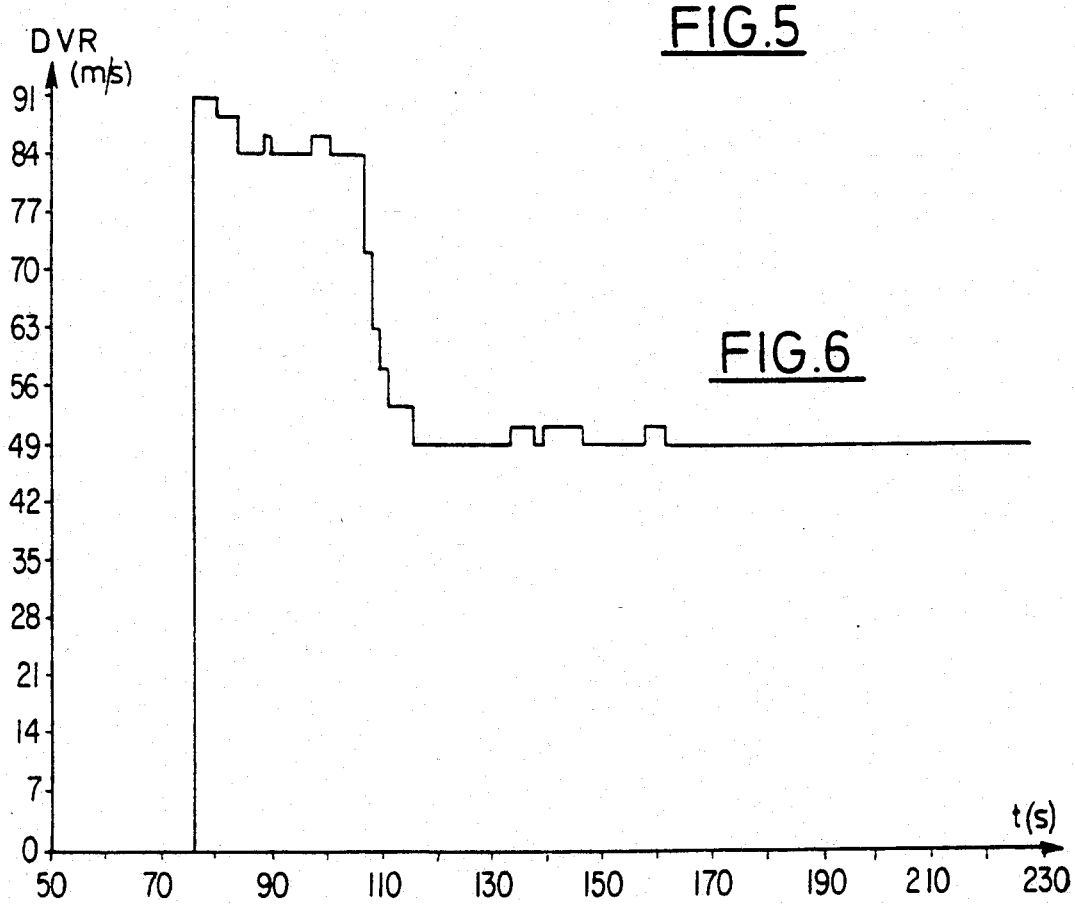

FIGS. 5 and 6 show examples of actual in-flight recordings made on a target, in this case an Airbus airliner.

FIG. 5 shows the development in time of a Doppler spectrum, each point corresponding, for a given moment, to a spectrum line. The solid line corresponds to the smoothed value of the target's relative speed, indicating the position of the principal line of the spectrum.

This figure also shows the progressive formation of the spectrum line series, which here includes a considerable number of secondary lines, typical of a system with several engines.

After 100 to 120 seconds, which in this example corresponds to a distance-off of about forty nautical miles, it is already possible to obtain a preliminary estimation of the category of target, which here can be considered with reasonable probability to be an airliner (for a fighter, whose spectrum is less rich and less intense, it would be necessary to wait for the aircraft to come closer).

After a period of about 200 seconds, when the aircraft is about twenty nautical miles away, the spectrum obtained is rich and stable enough to make it possible to confirm the preliminary estimation established previously and to try to determine more precisely the type of aircraft. This distance can also correspond to a typical TODI/TOCI (searching/continuous tracking) transition distance. After transition to TOCI mode, the radar being locked continuously on the target, the line series of the target can be acquired with much shorter intervals between sampling, typically about every two seconds.

FIG. 6 shows the development in time of the DVR difference between the principal line and the first order secondary line of the spectrum in FIG. 5.

It can be noted, in this example, that it is the second order lines, and not the first order lines, which appear first, thus giving, initially, a DVR value which is double the final value (the part of the curve illustrated corresponding to an interval of about 80–100 seconds).

It is only when the secondary lines appear in greater numbers (at around 100 seconds) that the calculated DVR value is seen to converge—and rapidly—with the final value. Therefore it is seen that this parameter, which, as indicated earlier, is the most significant parameter for determining the nature of the target, can very quickly be acquired.

In addition it is noted that, in this example, the final stable DVR value is obtained after a period of about 120 seconds, corresponding to a target distance of 40 nautical miles: a first identification of the target can thus be established at a much greater distance than for visual identification—even in conditions of perfect visibility.

What is claimed is:

1. A process for the recognition of an aerial target from samples of radar echoes returned by the target to thereby classify the target into a predetermined target category, comprising the steps of:
   transmitting a Doppler radar signal toward the aerial target;
   receiving a Doppler spectrum echo signal comprising a principal line and a plurality of secondary lines from the aerial target;
   determining a frequency difference between the principal line and a first order secondary line of the Doppler spectrum echo signal;
   determining an equivalent radar cross section of the aerial target from the Doppler spectrum echo signal;
   classifying the aerial target into a predetermined target category based on the determined frequency difference, the determined radar cross section, and a supplementary parameter, wherein the supplementary parameter is an intensity of the plurality of secondary lines relative to the principal line.

2. The process according to claim 1, wherein a correlation is also carried out between the Doppler spectrum echo signal received from the aerial target and spectra stored in a library memory containing spectra of a plurality of predetermined target.

3. The process according to claim 1, wherein determining the frequency difference between the principal line and the first order secondary line includes a filtering stage for the Doppler spectrum echo signal in which only a Doppler spectrum echo signal containing at least three identified spectrum lines are taken into account.

4. The process according to claim 1, further comprising the step of detecting a change in classification of the aerial target and triggering an electronic counter-countermeasures warning if any change in classification has been detected.

5. The process according to claim 2, further comprising the step of detecting any change in classification of the aerial target and triggering an electronic counter-countermeasure warning if any change in classification has been detected.

6. A process for the recognition of an aerial target from samples of radar echoes returned by the target to thereby classify the target into a predetermined target category, comprising the steps of:
   transmitting a Doppler radar signal toward the aerial target;
   receiving a Doppler spectrum echo signal comprising a principal line and a plurality of secondary lines from the aerial target;
   determining a frequency difference between the principal line and a first order secondary line of the Doppler spectrum echo signal;
   determining an equivalent radar cross section of the aerial target from the Doppler spectrum echo signal;
   classifying the aerial target into a predetermined target category based on the determined frequency difference and the determined radar cross section;
   wherein transmitting the Doppler radar signal toward the aerial target may be performed in either a first discontinuous information mode or a second continuous information mode, and if transmitting the Doppler radar signal toward the aerial target involves a transition from operating in the discontinuous information mode to operating in the continuous information mode, the classifications established are compared, respectively, before and after the transition, and if the comparison reveals a change in classification, a warning is triggered.

7. The process according to claim 2, wherein transmitting the Doppler radar signal toward the aerial target may be performed in either a first discontinuous information mode or a second continuous information mode, and if transmitting the Doppler radar signal toward the aerial targets involves a transition from operating in the discontinuous information mode to operating in the continuous information mode, the classifications established are compared, respectively, before and after the transition, and if the comparison reveals a change in classification, a warning is triggered.

8. The process according to claim 1, wherein a progressive determination of the frequency difference between the principal line and the secondary lines includes a filtering stage in which only differences greater than 1.8 times the difference obtained in a previous determinations are taken into account.

9. A process according to claim 6, wherein classifying the aerial target is carried out based on the determined frequency difference and the determined radar cross section and a supplementary parameter.

10. The process according to claim 9, wherein the supplementary parameter is the intensity of the plurality of secondary lines relative to the principal line.

11. The process according to claim 9, wherein the supplementary parameter is the total number of principal and secondary lines in the spectrum.

12. The process according to claim 6, wherein a correlation is also carried out between the Doppler spectrum echo signal received from the aerial target and spectra stored in a library memory containing spectra of a plurality of predetermined targets.

13. The process according to claim 6, wherein determining the frequency difference between the principal line and the first order secondary line includes a filtering stage for the Doppler spectrum echo signal in which only a Doppler spectrum echo signal containing at least three identified spectrum lines are taken into account.

14. A process according to claim 7, wherein classifying the aerial target is carried out based on the determined frequency difference and the determined radar cross section and a supplementary parameter.

15. The process according to claim 14, wherein the supplementary parameter is the intensity of the plurality of secondary lines relative to the principal line.

16. The process according to claim 14, wherein the supplementary parameter is the total number of principal and secondary lines in the spectrum.

17. The process according to claim 7, wherein a correlation is also carried out between the Doppler spectrum echo signal received from the aerial target and spectra stored in a library memory containing spectra of a plurality of predetermined targets.

18. The process according to claim 7, wherein determining the frequency difference between the principal line and the first order secondary line includes a filtering stage for the Doppler spectrum echo signal in which only a Doppler spectrum echo signal containing at least three identified spectrum lines are taken into account.

19. A process according to claim 8, wherein classifying the aerial target is carried out based on the determined frequency different and the determined radar cross section and a supplementary parameter.

20. The process according to claim 19, wherein the supplementary parameter is the intensity of the plurality of secondary lines relative to the principal line.

21. The process according to claim 19, wherein the supplementary parameter is the total number of principal and secondary lines in the spectrum.

22. The process according to claim 8 wherein a correlation is also carried out between the Doppler spectrum echo signal received from the aerial target and spectra stored in a library memory containing spectra of a plurality of predetermined targets.

23. The process according to claim 8, wherein determining the frequency difference between the principal line and the first order secondary line includes a filtering stage for the Doppler spectrum echo signal in which only a Doppler spectrum echo signal containing at least three identified spectrum lines are taken into account.

* * * * *